Dec. 2, 1969     R. K. UNTER     3,481,168
KEY CONSTRUCTION AND KEY RING
Filed Oct. 25, 1967
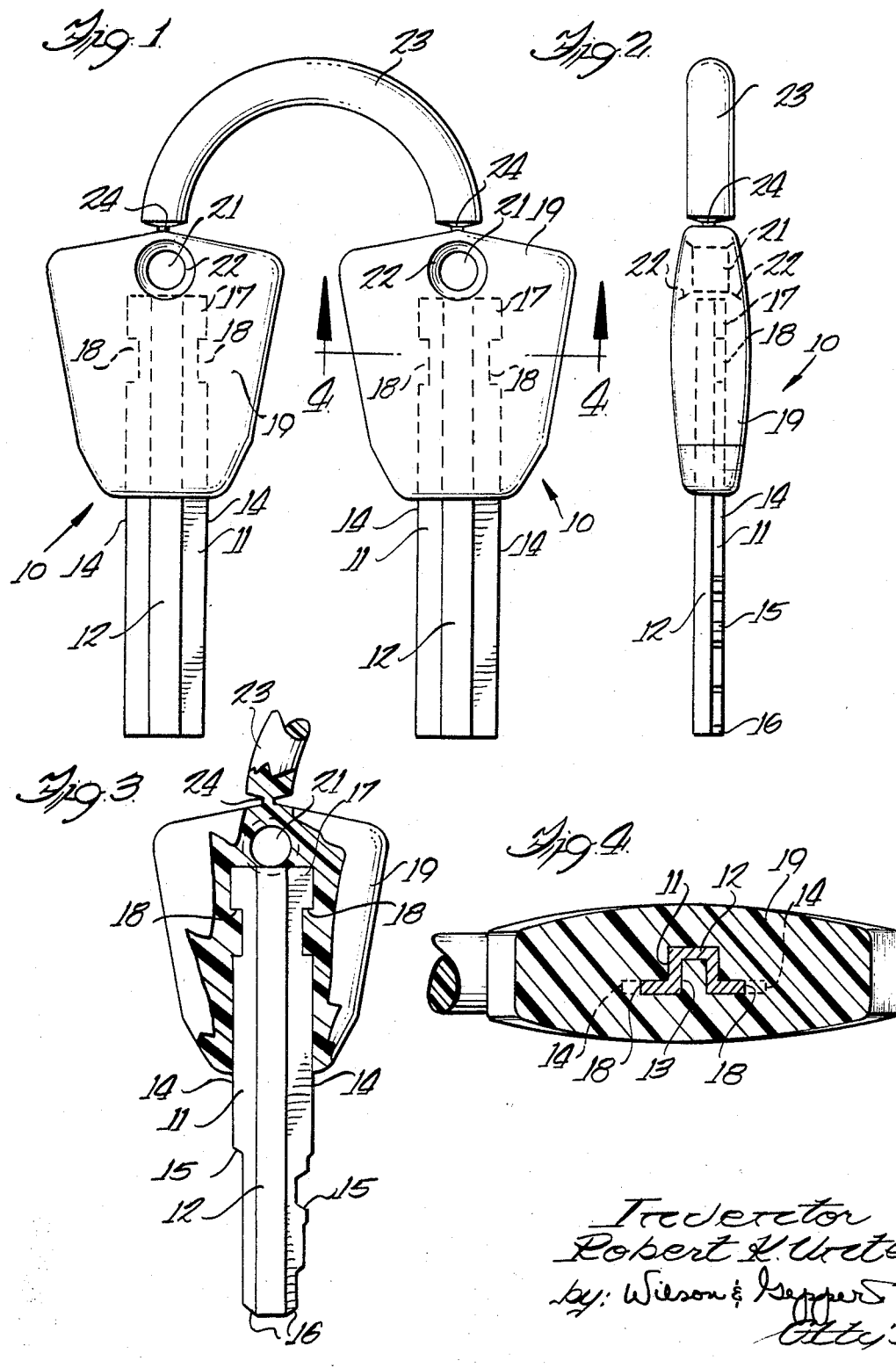

3,481,168
KEY CONSTRUCTION AND KEY RING
Robert K. Unter, Rockford, Ill., assignor to Keystone Steel
& Wire Company, a corporation of Delaware
Filed Oct. 25, 1967, Ser. No. 678,031
Int. Cl. E05b *19/04, 19/14;* A44b *15/00*
U.S. Cl. 70—408            2 Claims

ABSTRACT OF THE DISCLOSURE

A key construction and key ring connecting plural keys where each key has a metal blade with an end embedded and interlocked in a plastic key bow, and with the molded plastic key bows connected by an integral plastic mold runner joining the key bows to form a key ring, or the key bows can be broken off the runner for use as individual keys.

---

The present invention relates to a novel key construction and key ring and more particularly to a key construction having key bows molded onto metal key blades in interlocking relation and a mold runner connecting the key bows to serve as a key ring.

Among the objects of the present invention is the provision of a key construction utilizing a metal key blade and a plastic key bow formed on one end of the blade. The metal key blade is notched or recessed adjacent one end and the plastic material forming the key bow is molded about the retained and recessed end of the key blade with the plastic entering the notches or recesses to interlock the key blade and key bow in rigid assembly.

Another object of the present invention is the provision of a pair of metal key blades having a key bow molded about one end of each blade and a mold runner securely connecting the key bows to form a key ring interconnecting the two key bows and thus the formed keys.

A further object of the present invention is the provision of a key and ring construction and assembly utilizing extruded metal key blades or blanks with the key bows and mold runners formed by a suitable molding process, such as injection or transfer molding. The mold runner is joined to the key bow by a reduced runner portion such that the key formed of the key bow and key blade or blank may be broken away from the connecting mold runner if but a single key is desired.

Further objects are to provide a construction of maximum simplicity, efficiency, economy and ease of assembly, and such further objects, advantages and capabilities as will later more fully appear and are inherently possessed thereby.

In the drawing:

FIGURE 1 is a front elevational view of a pair of key blades or blanks having molded key bows joined by a mold runner forming a key ring.

FIG. 2 is a side elevational view of a molded key bow, key blade and the mold runner or key ring of FIG. 1, but showing bittings formed in the blade.

FIG. 3 is a fragmentary front elevational view of a key having the bittings formed on the key blade and a portion of the mold runner and key bow broken away to show one manner of interlocking the key blade and key bow.

FIG. 4 is an enlarged horizontal cross sectional view taken on the line 4—4 of FIG. 1.

Referring more particularly to the disclosure in the drawing wherein is shown an illustrative embodiment of the present invention, FIG. 1 discloses a key construction and key ring where a pair of keys 10, 10 are each formed utilizing an extruded metal key blade or blank 11 having the desired cross sectional configuration and a molded plastic key bow 19 formed about one end of the blade.

The key blade 11 is shown provided with a suitable longitudinal rib 12 on one side forming a complementary longitudinal groove 13 on the opposite side, and a pair of opposite edges 14, 14 on which suitable bittings 15 are formed (FIGS. 2 and 3) for actuation of the tumblers in a lock.

The edges 14, 14 adjacent one end are beveled at 16 to provide for ease of entrance in a lock (not shown) and adjacent the opposite end 17 the edges are shown formed with suitable notches or recesses 18, 18 for interlocking with the plastic of the key bow 19. The key bow 19 is formed of a suitable plastic material that can be molded onto the key blade 11 by a suitable molding process, such as injection or transfer molding, with the plastic flowing into the recesses of the blade including the notches 18, 18 and groove 13. The key bow 19 has a generally smooth rounded configuration with an opening 21 formed therein which is enlarged or countersunk at 22 at the outer surfaces thereof. In the molding operation, a mold is utilized which will accommodate two or more key blades 11 and has a mold cavity for each key bow 19 and a connecting mold runner passage of a generally circular cross section to provide a plastic generally semi-circular or arcuate mold runner 23 connecting the key bows 19, 19. The mold runner is reduced at 24 adjacent the key bow 19 so that the formed key can be broken off from the mold runner if but a single key is desired.

The opening 21 in each key bow is formed adjacent the inner end 17 of the key blade for receiving a key chain or ring or for mounting in a key case if the formed key is separated from the runner 23. Otherwise, the mold runner 23 acts as a key ring for the two attached keys 10, 10. Although a mold runner 23 is shown joining a pair of keys, it is contemplated that more than two keys may be formed integral with a connecting mold runner, if desired.

Having thus disclosed my invention, I claim:

1. A key and integral key ring construction comprising plural elongated metallic key blades, a molded plastic key bow for each key blade and in which one end, of said key blade is embedded, each of said key blades having exposed edges for the formation of key bittings and the embedded end having its opposite edges notched, each said key bow being molded about said notched end of the key blade with the plastic material filling the notches to interlock the key bow an key blade together, and a curved plastic runner of the same plastic material as the key bows integral with and connecting the key bows to form a key ring joining the keys.

2. A key and integral key ring construction as set forth in claim 1, in which said curved plastic runner is reduced in cross section adjacent each key bow so that the keys can be broken away from the plastic runner.

References Cited

UNITED STATES PATENTS

| | | | |
|---|---|---|---|
| 3,423,973 | 1/1969 | Ancliff | 70—408 |
| 3,427,833 | 2/1969 | Lempke | 70—408 |
| 2,793,842 | 5/1957 | Bacon | 259—144 |
| 2,819,792 | 1/1958 | Margulis | 206—47 |
| 3,208,249 | 9/1965 | Stackhouse | 70—395 |

FOREIGN PATENTS

| | | |
|---|---|---|
| 640,136 | 3/1928 | France. |
| 648,730 | 1/1951 | Great Britain. |
| 1,345,609 | 11/1963 | France. |

MARVIN A. CHAMPION, Primary Examiner
ROBERT L. WOLFE, Assistant Examiner

U.S. Cl. X.R.

70—457, 453